B. KENT.
Grab for Removing Detached Drills from Artesian Wells.

No. 165,676.  Patented July 20, 1875.

Witnesses:
H. C. Merrick
J. C. Robin

Inventor:
Brazilla Kent

UNITED STATES PATENT OFFICE.

BRAZILLA KENT, OF BINGHAMTON, NEW YORK.

IMPROVEMENT IN GRABS FOR REMOVING DETACHED DRILLS FROM ARTESIAN WELLS.

Specification forming part of Letters Patent No. 165,676, dated July 20, 1875; application filed May 12, 1875.

*To all whom it may concern:*

Be it known that I, BRAZILLA KENT, of Binghamton, in the county of Broome and State of New York, have invented a new and useful Improvement in Grabs for Removing Detached Drills from Artesian Wells, which improvement is fully set forth in the following specification, reference being had to the accompanying drawings.

My invention consists in the combination of the grab, sinker and jar bars in such a manner that the device shall be capable of grappling on the drill, loosening and removing it from the well, the object of the invention being to supply a device that may be readily applied, and that shall effectually and quickly remove the drill.

Figure 1:
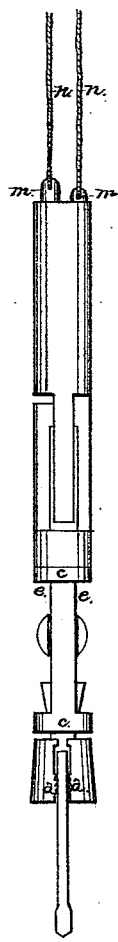
Figure 3:
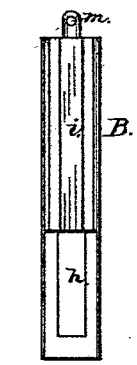
Figure 4:
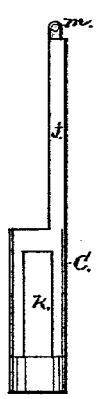
Figure 2:
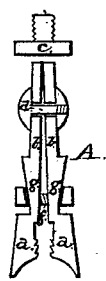

Figure 1 in the drawings is a device embodying my invention, showing the jaws closed on the drill. Fig. 2 is a longitudinal section of the grab detached from the sinker-bar, showing the connection of the parts. Figs. 3 and 4 are the sinker and jar bars separated.

A is the grab, which consists of two jaws, $a$, having extensions $b\ b$ incased in a socket, $c$, which is cut away on opposite sides flush with the jaw-extensions $b$, which are secured in position by a screw, $d$, having a head and nut, which extend over the cut-away sides $e$ of the socket $c$. This head and nut guide the vertical movement of the jaws $a$, which are opened by the pressure of a spiral spring, $f$. The neck $g$ of the jaw is made tapering, and works in a corresponding bearing in the end of the socket $c$, as shown by Fig. 2, so that when the end of the drill has entered between the flaring jaws of the grab by the downward movement of the device, an upward movement shall cause them to close on it; but as the drill sometimes sticks or gets set, it requires a jar to loosen it. I accomplish this by combining the grab A and sinker and jar bars C and B, as shown in Fig. 1. The sinker-bar B is made of solid round iron, with a flattened surface and slot $h$ near the lower end, and a longitudinal groove, $i$, is cut in its side for the extension-piece $j$ of the bar C to work in. This bar has a link or slot, $k$, which connects with the slot $h$ in the sinker-bar B. The lower end of the link $k$ has a round collar or shoulder, and a screw cut in the end for the connection of the grab A. The upper ends of these bars are provided with loops or eyes $m$, for the attachment of the cords $n$.

When a detached drill is to be removed, the cord to which the jar-bar C is attached is connected with a pulley or windlass at the mouth of the well, and the cord of the sinker-bar B to the end of a working-beam. The device is then entered and let down into the well until it comes in contact with the end of the drill, when the flaring jaws $a$ guide it between their tempered steel teeth by the gravitation of the implement. The end of the working-beam is then elevated, which draws up the sinker-bar B until the lower end of the link or slot $h$ strikes the upper end of the link $k$ in the jar-bar C, by which operation the drill is loosened from the rock, and withdrawn from the well by turning the windlass.

I am aware that there are grapples made in separate parts now in use for extracting detached drills and substances from artesian wells, which require much trouble and time to accomplish the object; but

What I claim as new, and desire to secure by Letters Patent, is—

The combination of the grab A, having a tapering neck, $g$, working in a corresponding bearing in the end of the socket $c$, with the jar-bar C and its guide-extension $j$, working in the groove $i$ in the sinker-bar, and the sinker-bar B, all constructed substantially as herein described, for the purpose set forth.

BRAZILLA KENT.

Witnesses:
PERRY P. ROGERS,
ALFRED C. POPE.